(12) United States Patent
Chaturvedi et al.

(10) Patent No.: US 8,595,361 B2
(45) Date of Patent: *Nov. 26, 2013

(54) VIRTUAL MACHINE SOFTWARE LICENSE MANAGEMENT

(75) Inventors: Pradeep Kumar Chaturvedi, Bangalore (IN); Prem Sankar Gopannan, Venkata Nagar (IN)

(73) Assignee: Novell, Inc., Provo, UT (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/368,438

(22) Filed: Feb. 10, 2009

(65) Prior Publication Data

US 2010/0205303 A1    Aug. 12, 2010

(51) Int. Cl.
*G06F 15/173* (2006.01)

(52) U.S. Cl.
USPC .................. 709/226; 705/51; 705/57; 705/59

(58) Field of Classification Search
USPC ................................. 709/226; 705/51, 57, 59
See application file for complete search history.

(56) References Cited

U.S. PATENT DOCUMENTS

| | | | |
|---|---|---|---|
| 7,577,722 B1 | 8/2009 | Khandekar | |
| 2002/0013802 A1* | 1/2002 | Mori et al. | 709/1 |
| 2003/0115344 A1 | 6/2003 | Tang et al. | |
| 2004/0019565 A1* | 1/2004 | Goringe et al. | 705/59 |
| 2005/0132367 A1 | 6/2005 | Tewari et al. | |
| 2005/0198303 A1* | 9/2005 | Knauerhase et al. | 709/227 |
| 2006/0004667 A1* | 1/2006 | Neil | 705/59 |
| 2006/0161652 A1 | 7/2006 | Takizawa et al. | |
| 2007/0002761 A1 | 1/2007 | Diamant et al. | |
| 2007/0064661 A1 | 3/2007 | Sood et al. | |
| 2007/0162594 A1 | 7/2007 | Henry et al. | |
| 2008/0028071 A1 | 1/2008 | Miyajima | |
| 2008/0046680 A1 | 2/2008 | Nagata et al. | |
| 2008/0098465 A1 | 4/2008 | Ramakrishna et al. | |
| 2008/0134177 A1 | 6/2008 | Fitzgerald et al. | |
| 2008/0183626 A1 | 7/2008 | Romero et al. | |
| 2008/0244579 A1* | 10/2008 | Muller | 718/100 |
| 2008/0250407 A1 | 10/2008 | Dadhia et al. | |
| 2009/0144510 A1* | 6/2009 | Wibling et al. | 711/147 |
| 2010/0132011 A1* | 5/2010 | Morris et al. | 726/1 |
| 2010/0205304 A1* | 8/2010 | Chaturvedi et al. | 709/226 |

FOREIGN PATENT DOCUMENTS

EP    1612642 A2    1/2006

OTHER PUBLICATIONS

"European Application Serial No. 10153097.0, European Search Report mailed Jul. 5, 2010", 6 Pgs.

"U.S. Appl. No. 12/368,489, Final Office Action mailed Mar. 7, 2011", 22 pgs.

(Continued)

*Primary Examiner* — Duyen Doan
(74) *Attorney, Agent, or Firm* — Schwegman Lundberg & Woessner, P.A.

(57) ABSTRACT

Apparatus, systems, and methods may operate to receive reports at a server node, the reports indicating a change in virtual machine status for virtual machines hosted on a virtual machine host node; and to allocate/de-allocate software licenses to the virtual machines based on the change in virtual machine status. In some embodiments, operations may include detecting, at a virtual machine host node, a change in virtual machine status for virtual machines hosted on the host node; and transmitting reports to a server node from the host node. The reports can be used to indicate the change in virtual machine status, enabling the server node to allocate/de-allocate software licenses to the virtual machines based on the change in virtual machine status. Additional apparatus, systems, and methods are disclosed.

26 Claims, 4 Drawing Sheets

(56) References Cited

OTHER PUBLICATIONS

"U.S. Appl. No. 12/368,489, Advisory Office Action mailed Jun. 3, 2011", 3 pgs.
"U.S. Appl. No. 12/368,489, Response filed May 9, 2011 to Final Office Action mailed Mar. 7, 2011", 12 pgs.
"U.S. Appl. No. 12/368,489, Response filed Jun. 7, 2011 to Final Office Action mailed Mar. 7, 2011 and Advisory Action mailed Jun. 3, 2011", 12 pgs.
"European Application Serial No. 10153096.2—Summons to Attend Oral Proceedings", 6 pgs.

* cited by examiner

VIRTUAL MACHINE SOFTWARE LICENSE MANAGEMENT

CROSS-REFERENCE TO RELATED APPLICATIONS

This application is related to co-pending and commonly-assigned U.S. patent application Ser. No. 12/368,489, titled "VIRTUAL MACHINE ADDRESS MANAGEMENT," filed on even date herewith and incorporated herein by reference in its entirety.

BACKGROUND

A server can be used to allocate software licenses to other entities in a network. These network entities, such as clients, can request the allocation of software licenses as physical machines, or virtual machines (VMs).

In a virtualized environment, VM sprawl is a common scenario. With VM sprawl, it can be cumbersome for an administrator to track the usage of software licenses, since the server that allocates licenses may not be aware of VM life cycle events. For example, a VM may be cloned, with the original VM and the cloned VM continuing to operate using a single license, even though two sets of software are now operating as part of two different VMs. Thus, maintaining license usage within the total allocated usage as part of this scenario can be difficult. Further, VMs may be destroyed without the knowledge of the server, so that licenses allocated to a destroyed VM can remain allocated long past the time they are actually needed. Therefore, efficiently allocating licenses in a virtual environment can also be a challenge.

SUMMARY

In various embodiments, apparatus, systems, and methods that support VM software license management are provided. For example, in some embodiments, such management is enabled by receiving reports at a server node, the reports indicating a change in VM status for VMs hosted on a VM host node; and allocating/de-allocating software licenses to the VMs based on the change in VM status.

In some embodiments, operations may include detecting, at a VM host node, a change in VM status for VMs hosted on the host node; and transmitting reports to a server node from the host node. The reports may indicate the change in VM status, enabling the server node to allocate/de-allocate software licenses to the VMs based on the change in VM status. Additional embodiments are described, and along with the foregoing examples, will be set forth in detail below.

DETAILED DESCRIPTION

Figure 1:
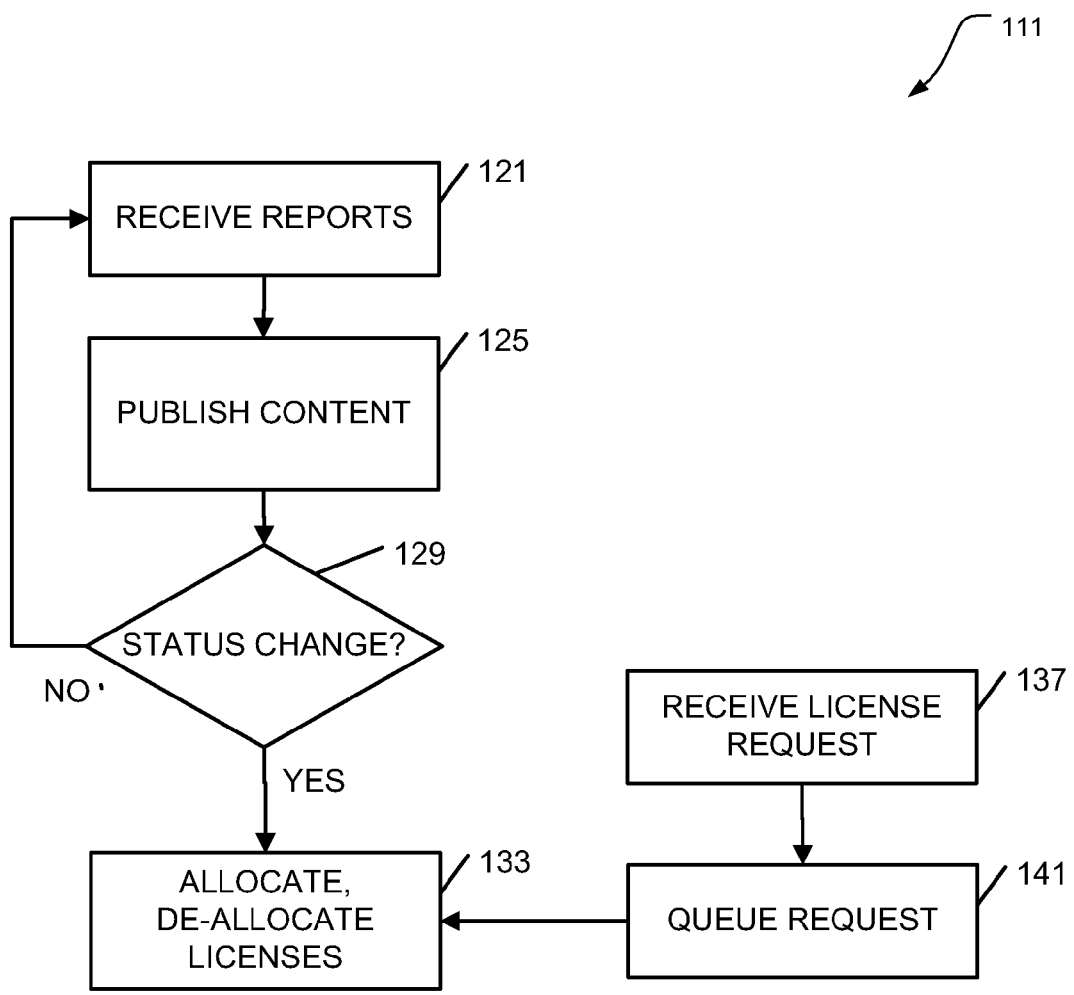
FIG. 1 is a flow diagram illustrating VM software license management methods according to various embodiments of the invention.

Some of the challenges described above may be resolved by improving software license management mechanisms that operate within a virtualized environment. For example, in some embodiments, a pair of agents, one residing on a VM host, and another one on a server, may operate to communicate the status of VMs on the host between themselves.

In this way, a mechanism can be implemented to maintain updated information regarding the allocation of licenses to VMs. This may help to curtail the use of duplicate licenses by VMs when VMs are cloned. In addition, licenses may be allocated more efficiently—so that they are only allocated when needed, and not at other times. Thus, when a VM is destroyed, licenses used by the destroyed VM can be freed for use by another VM which has applied for the same kind of license. In cases where no more licenses are available, requests from VMs can be queued for future allocation—as soon as the appropriate license becomes available.

As noted previously, the apparatus to implement some of the embodiments may comprise a server and multiple agents. Agents can operate on each VM, and on the VM Manager layer as well (e.g., on the VM Host).

The agent on the VM manager layer can serve several functions:
  notify the server of VM life cycle events, such as cloning, migration, startup, and destruction
  maintaining a unique VM UUID across all VMs, and generate a new UUID when VMs are copied or cloned
  notify the server of licenses needed when a new VM is created, perhaps using information derived from a VM configuration file (which may also include information on the software that should be installed on the new VM.

An agent operating on an individual VM can also serve several functions:
  maintain and provide a list of licensed software to the server
  notify the server of license expiration, and request a new license
  deactivate software as requested by the server when a licensing violation is detected.

Software can be deactivated by changing the registry entry for the appropriate VM, or by changing its configuration file. The agent on the VM can also delete the license or certificate that resides on the VM that is used to activate the software.

The license allocation server can be used to implement the bulk of the license management operations. For example, the server may operate to maintain a list of available software licenses and the total number of licenses used in a VM environment at any point in time. Logic in the server can be used to effectively manage the use of software licenses, so that if a particular license is not used, the server can search the license request queue to notify any requesting VMs of license availability on an as-needed basis.

The server can also collect data from an agent operating on the VM manager layer, and/or from each VM agent. For example, a VM agent can provide details of each licensed application running on a particular VM. In this way, the server is assisted in tracking license use.

In some embodiments, the server can send notifications to any VM agent when there is license violation, as well as receiving requests from the VM agents for new licenses—these requests can be placed in a queue. If a new license is available, the server can provide the details of license activation to the VM agent, so that the license can be activated. If a new license is not available, the server can notify the VM agent as soon as the appropriate license becomes available, using information resulting from shutdown (e.g., when using a floating licensing model) or destruction of other VMs, provided by their agents or the VM manager.

The server thus receives information and acts on life cycle events that occur with respect to each VM. When a VM is cloned, copied or moved, the VM host agent may operate to generate a new VM UUID. The server may then inventory the VMs and update its license database. Similarly, if a VM is destroyed, all licenses allocated to it can be immediately returned to the available license pool for re-allocation, and the database can likewise be updated.

When a VM is shut down, the licenses used by that VM are freed for use by other VMs. When a VM is started, information regarding the new VM is presented by the agent of the VM to the server, and the database of available licenses maintained by the server can be updated. When a license used by a first VM is allocated to a second VM, the agent of the first VM can be notified to deactivate the corresponding license, if desired.

One or more policies can be used to direct how software licenses are allocated, based on the VM status, and perhaps other communications between the server and a VM manager (VMM) and/or individual VMs. For example, when some selected number of VMs have been created at a single VM host, the future allocation of software licenses to newly-created VMs on that host can be restricted (e.g., when a rogue administrator attempts to create VMs that request software licenses until the pool of licenses is exhausted). Similarly, when a VM is cloned, a new software license can be allocated to a clone, if authorized, instead of using the same license for two different VMs. Further, licenses can be denied when requests are associated with MAC addresses that are not valid for a particular network.

In addition, a policy framework can be added to the system to allocate licenses on a preferred basis. Thus, some tasks may gain preference over others, so that licenses are allocated to the most important processes as they are needed. Similarly, licenses can be deactivated for VMs that are running low priority processes, rather than for VMs that may have just begun executing a process. These are just a few examples of many such policies that can be put in place.

In this way, operations of a license allocation server can be enhanced to support events that make up the VM life cycle, such as VM creation, cloning, and destruction, as well as VM shut down. Such policies can be devised by a system or network administrator to define license allocation rules for VMs based on VM host operations and VM life cycle events.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating VM license management methods 111 according to various embodiments of the invention. The methods 111 are implemented in a machine-accessible and readable medium. The license management methods 111 are operational over processes within and among networks. The networks may be wired, wireless, or a combination of wired and wireless. The methods 111 may be implemented as instructions, which when accessed by a machine, perform the processing depicted in FIG. 1. Given this context, VM license management is now discussed with reference to FIG. 1.

In some embodiments, a computer-implemented method of managing VM software license allocation from a server node may begin at block 121 with receiving reports at a server node, the reports indicating a change in VM status for VMs hosted on a VM host node.

The reports may include the identity and/or state of one or more VMs. Thus, the reports may comprise at least an identity of one or more VMs, and/or the state of one or more VMs. Identification of the VMs can be accomplished by receiving the UUID for any one of them, or some other identification information. Thus, the VM identity may comprise a UUID.

Content from the reports can be published, perhaps by transmitting them to another location, or displaying them on a display. Thus, the method 111 may include, at block 125, publishing content from the reports to a system administrator.

The method 111 may include monitoring the status of VMs at block 129, to determine if any change has occurred. A change in VM status can be indicated directly (e.g., a change as such), or indirectly, so that the server node must combine the present information, along with prior information, to determine that a change has occurred. For example, each time a change occurs, the new status can be reported as a changed status, so that the server node can act immediately on the change information. Thus, the change in VM status can be determined directly from a single one of the reports.

Alternatively, or in addition, the VM status can be reported to the server node periodically, whether a change has occurred or not, and the server node can operate to compare information from the current report to information included in a prior report to determine whether any change in status has occurred. Thus, the change in VM status can also be determined indirectly from multiple ones of the reports. In either case, if no change in status is noted, the method 111 may continue by looping back to block 121, to receive additional reports.

If a change in VM status is determined to have occurred at block 129, the method 111 may go on to block 133 to include allocating or deallocating software licenses to the VMs based on the change in VM status. Thus, as viewed from the server side, reports on the status of VMs on a host node can be received at the server node, and software licenses can then be allocated and de-allocated to the VMs according to their status, and perhaps one or more policies.

Thus, allocating may comprise calling a VM preference module that refers to at least one policy to determine the allocating or the deallocating. In this way, a preference module can be called to allocate/de-allocate software licenses according to preferences for some VMs over others, based on a policy referenced by the server node.

As noted previously, a variety of VM life cycle events may be taken into account by the allocation module on the server. Such events may comprise one or more of creation, destruction, cloning, suspension, resumption, pausing, startup, or shut down. In some embodiments, allocating comprises restricting allocation based on such life cycle events.

In some embodiments, the method 111 includes, at block 137, receiving a request for a license. Such requests may result in immediate allocation of a license. However, such requests may be denied as well. For example, allocation of software licenses can be denied according to a policy, such as when the MAC address or UUID of the requesting VM is not valid within the server network, or when the host has requested more than some selected threshold number of licenses over a selected period of time (e.g., a flood of licensing requests), or when the request is above the number of licenses available from the server. Thus, allocating at block 133 may include, in response to a request for a license from one of the VMs, denying allocation of at least one of the software licenses.

A request that has been denied may be placed in a license request queue. Thus, the method 111 may include placing the request in a license request queue at block 141. Other embodiments may be realized.

Figure 2:
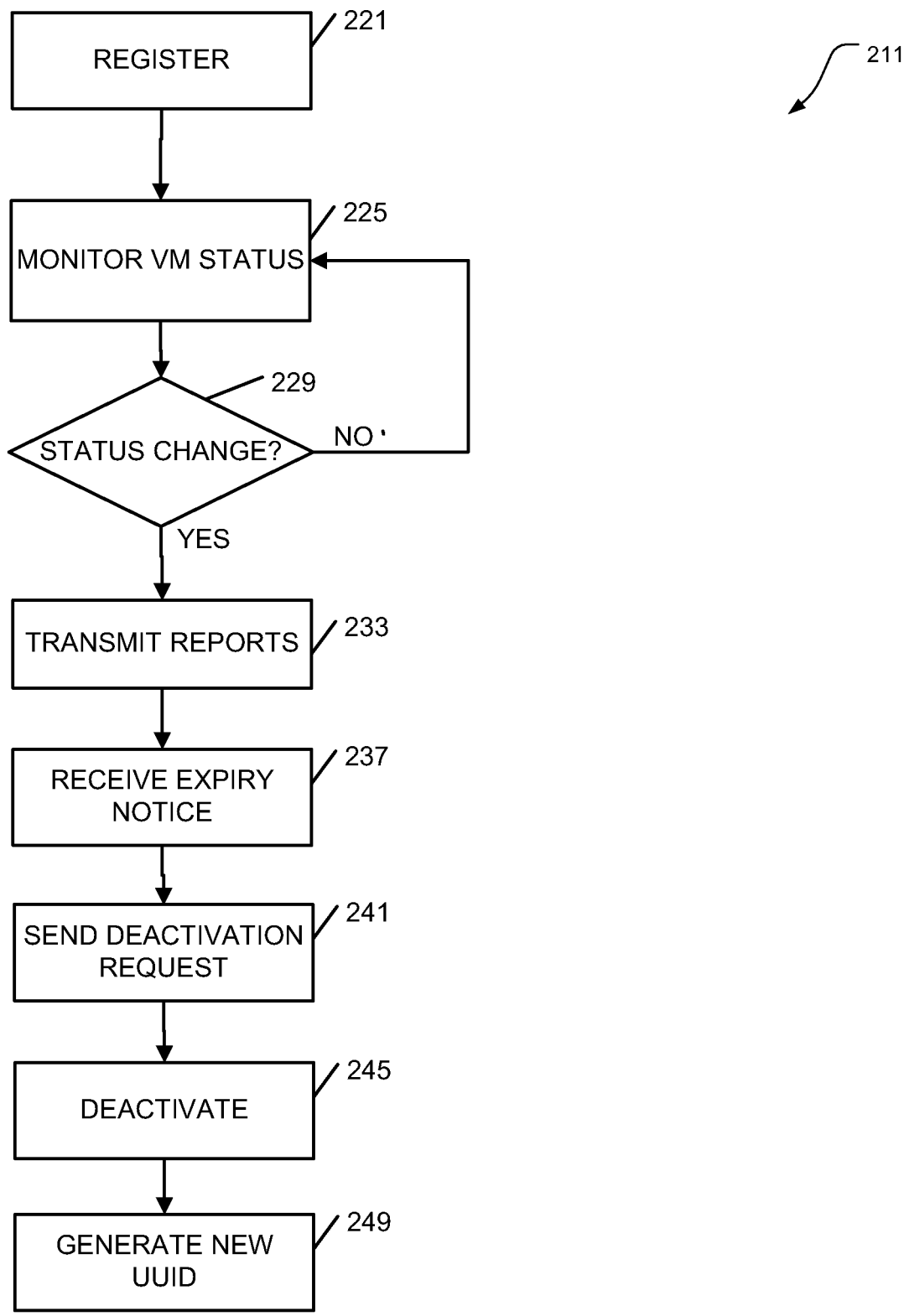
FIG. 2 is another flow diagram illustrating VM software license management methods according to various embodiments of the invention.

For example, FIG. 2 is another flow diagram illustrating VM license management methods 211 according to various embodiments of the invention. In this case, VM license management is described with increased emphasis on host node operations. The methods 211 are implemented in a machine-accessible and readable medium, and are operational over processes within and among networks. The networks may be wired, wireless, or a combination of wired and wireless. The methods 211 may be implemented as instructions, which when accessed by a machine, perform the processing depicted in FIG. 2.

To implement VM software license management from a host node, for example, a method 211 may begin at block 221 with registration—a VM state change notifier module can be used to transmit VM status reports, and the information in the reports can be obtained by having the change notifier module register with a hypervisor running on the host node.

The method 211 may continue on to block 225 with monitoring VM status. This may occur by reviewing notifications obtained from the registered VM state change notifier module, or perhaps, by communicating directly with the host node hypervisor, as it monitors the operational status of various VMs. If no change in status is detected at block 229, the method 211 may loop back to block 225 with monitoring the VM status.

Thus, the method 211 may include, at block 229, detecting, at a VM host node, a change in VM status for VMs hosted on the host node. If a change in VM status is detected at block 229, then the method 211 may continue on to block 233 with transmitting reports to a server node from the host node, the reports indicating the change in VM status, to enable the server node to allocate or de-allocate software licenses to the VMs based on the change in VM status.

Transmitting may include a variety of activities, depending on the nature of the communication between the host node and the server. For example, as mentioned previously, a VM state change notifier module can be used to transmit the status reports. Thus, the transmitting in this case may comprise transmitting the reports from a VM state change notifier module residing on the host node to a VM state change receiver module residing on the server node. In other embodiments (e.g., where a hypervisor monitors and reports VM status directly), transmitting may comprise transmitting the reports directly from a hypervisor operating on the host node. In this case, the reports can be communicated without using an add-on module.

The reports can include the status/change in status of a VM, and its identity in the form of a MAC address and/or UUID. Thus, the reports may comprise at least one of a status or a change in status of at least one of the VMs, and a universally unique identifier (UUID) of the at least one of the VMs.

In some embodiments, the VM manager layer receives notice of license expiration from an affected VM, and then the VM manager subsequently instructs the VM to deactivate the license. In some embodiments, the VM notifies the server node that the license has expired, and the server responds directly to the VM when another license becomes available. Thus, the deactivation request can go directly from the server to the VM, or the deactivation request can be routed via the VM manager. Therefore, the method 211 may include, at block 237, receiving notification of license expiration from one of the VMs.

Similarly, the deactivation request may come directly from the server to the VM, or it can be routed from the server, through the VM manager, to the VM. Therefore, the method 211 may include, at block 241, sending a license deactivation request to at least one of the VMs from the VM host node. Also, when a VM is destroyed or powered down for a significant period, the VM manager can send a deactivation request to the server upon determining the VM state.

The method 211 may go on to block 245 to include deactivating software associated with the license expiration until a new license is allocated by the server.

When a VM is moved or cloned, the VM manager may operate to generate a new UUID to associate with the VM. Thus, the method 211 may continue on to block 249 with generating a new UUID to associate with one of the VMs when the change in VM status indicates a new status of moved or cloned.

The methods of managing software licenses shown in FIGS. 1 and 2 can be implemented in a computer-readable storage medium, where the methods are adapted to be executed by a processor. Further details of such embodiments will be provided below.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

Figure 3:
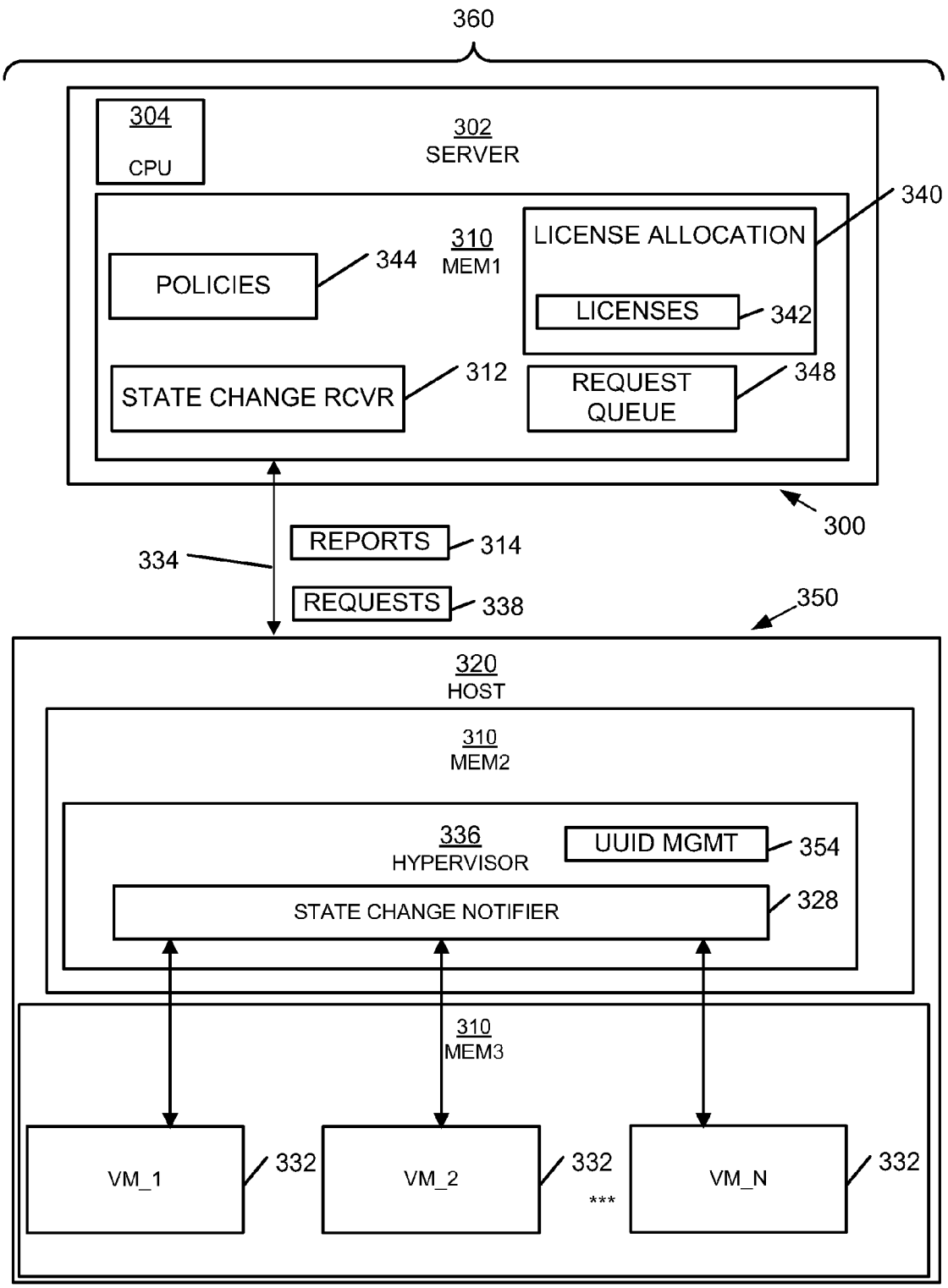
FIG. 3 is a block diagram of VM software license management apparatus and systems according to various embodiments of the invention.

For example, FIG. 3 is a block diagram of VM software license management apparatus 300, 350 and systems 360 according to various embodiments of the invention. Here it can be seen that an apparatus 300 used to implement VM license management may comprise a server node 302 and a VM state change receiver module 312 to receive reports 314 at the server node 302. The reports 314 may include any of the content described previously with respect to the VMs 332, a hypervisor module 336, or the host node 320, to assist in allocating licenses 342, perhaps according to one or more policies 344. The apparatus 300 may comprise a virtual server in some embodiments.

The server node 302 can maintain an inventory of software licenses 342. The server node 302 can also work with an external module (not shown) for allocation and deallocation of software licenses 342.

Thus, when an apparatus 300 to assist in VM license management comprises a server node 302 and a VM state change receiver module 312, the receiver module 312 may be used to receive reports 314 at the server node 302. The reports 314 may indicate a change in VM status for VMs 332 hosted on a VM host node 320, and the server node 302 may operate to allocate or de-allocate software licenses 342 to the VMs 332 based on the change in VM status.

In some embodiments, the apparatus 300 comprises a memory 310 to store a queue 348 of license requests 338 associated with the software licenses 342. In this way, the apparatus 300 may operate a licenses request queue 348 to store requests 338 from the VMs 332 or the VM manager (e.g., a hypervisor 336) when license requests 338 from individual VMs are denied. Requests 338 for licenses 342 may come to the server node 302 via the VM manager, or directly from the VMs 332.

A license allocation module 340 may be used to associate the UUID of each VM 332 with the software licenses 342 that have been allocated to it, to enable tracking software licenses and compliance with license requirements. Thus, the apparatus 300 may include a license allocation module 340 to associate a UUID for each one of the VMs 332 with the software licenses that have been allocated. Further embodiments may be realized.

For example, an apparatus 350 may comprise a VM host node 320 to host a plurality of VMs 332. The apparatus may also comprise a VM state change notifier module 328. The module 328 is shown as part of the hypervisor 336 in FIG. 3. However, it may just as well exist as a single separate module, or as a series of separate modules that form part of each one of the VMs 332. In each case, the module 328 can be used to detect, at the VM host node 320, a change in VM status for the VMs 332. Thus, in some embodiments, a hypervisor 336 can be modified to include the functions of the VM state change notifier module 328, and the VM state change notifier module 328 then forms part of a hypervisor module 336 to monitor operations of the VMs 332 on the VM host node 320.

The VM state change notifier module 328 may be used to transmit reports 314 to the server node 302, the reports 314 indicating a change in VM status, thus enabling the server node 302 to allocate or de-allocate licenses 340 to the VMs 332 based on the change in VM status, and perhaps, one or more policies 344. In some embodiments, the apparatus 350 may comprise a client node.

Requests 338 for licenses 342 to the server node 302 can be associated with the corresponding VM UUID. Thus, the apparatus 350 may further comprise a UUID management module 354 to create a new UUID for each one of the VMs 332 when each one of the VMs 332 is created, so that the UUID can be associated with license requests 338 to the server node 302.

The VM software license management apparatus 300, 350 may be implemented in a machine-accessible and readable medium that is operational over one or more networks (e.g., comprising path 334). The networks may be wired, wireless, or a combination of wired and wireless. The VM software license management apparatus 300, 350 implement, among other things, the processing associated with the methods 111 and 211 of FIGS. 1 and 2, respectively. Modules may comprise hardware, software, and firmware, or any combination of these.

Additional embodiments may be realized. For example, it can be seen that a VM software license management system 360 may comprises multiple instances of each one of the apparatus 300, 350. Still further embodiments may be realized.

Figure 4:
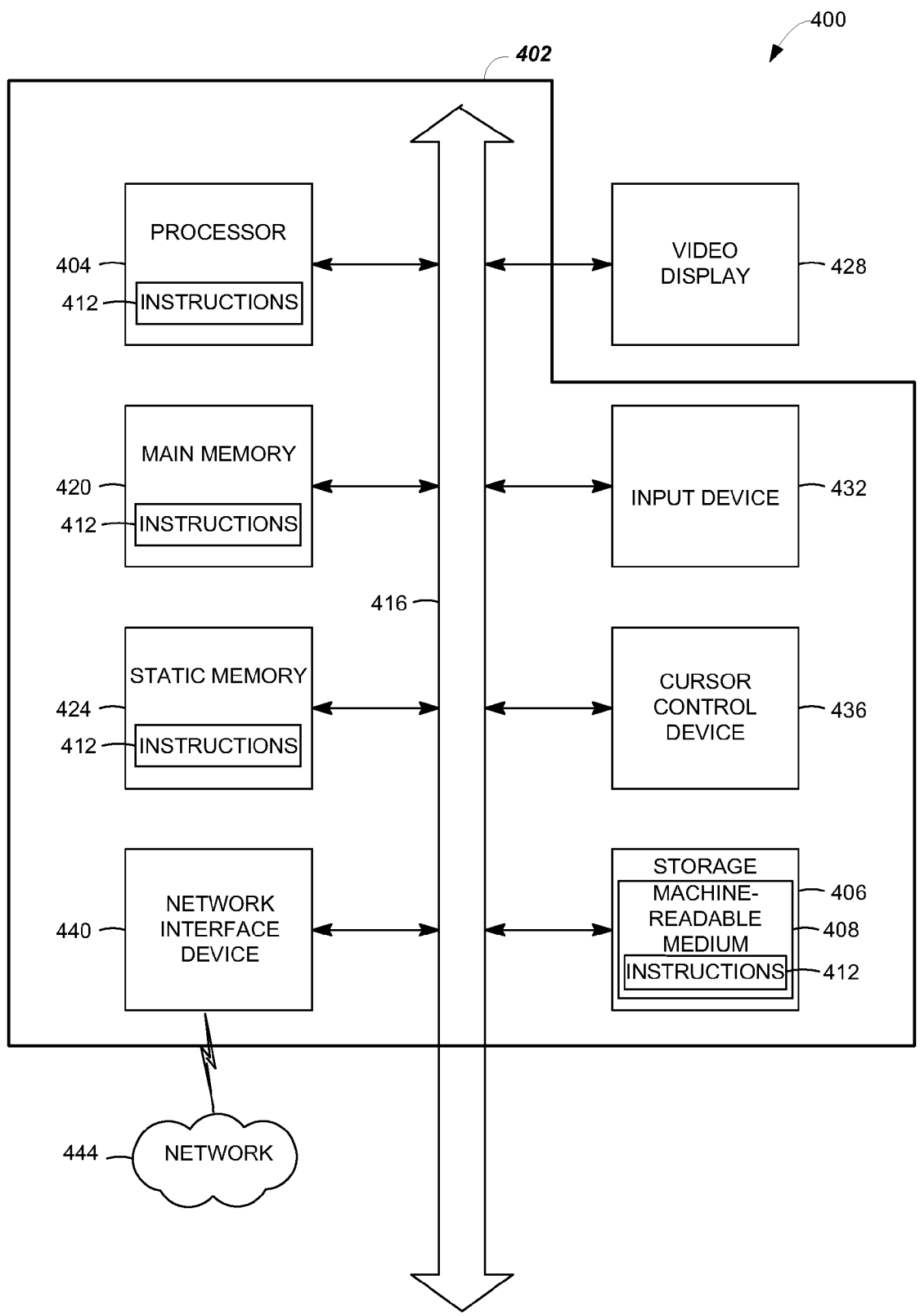
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300, 350 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make a software license management entity aware of VM life cycle events, so that more effective software license management can be accomplished. Policies can be defined by a network or system administrator to regulate the allocation of software licenses in a virtual environment, with the option of using VM UUIDs in association with the allocated licenses. More efficient allocation of licenses, along with greater accountability for license use, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a server node including a first memory to store a plurality of software licenses; and
   a virtual machine state change receiver module to receive reports at the server node, the reports indicating a change in virtual machine status for virtual machines hosted on a virtual machine host node, each of the virtual machines assigned to a universally unique identifier (UUID), the UUIDs for the virtual machines being different from one another, the server node to allocate or de-allocate one or more of the plurality of software licenses to the virtual machines based on the change in virtual machine status and the server node to place a request for a license from one of the virtual machines in a license request queue in response to allocation of a corresponding software license being denied.

2. The apparatus of claim 1, further comprising:
   a second memory to store the license request queue.

3. The apparatus of claim 1, further comprising: a license allocation module to associate the universally unique identifier (UUID) for each one of the virtual machines with a corresponding one of the software licenses that have been allocated.

4. An apparatus, comprising:
   a virtual machine host node including a memory to host a plurality of virtual machines, each of the virtual machines assigned to a universally unique identifier (UUID), the UUIDs for the virtual machines being different from one another; and
   a virtual machine state change notifier module to detect, at the virtual machine host node, a change in virtual machine status for the virtual machines, and to transmit reports to a server node, the reports indicating the change in virtual machine status, to enable the server node to allocate or de-allocate one or more of a plurality of software licenses to the virtual machines based on the change in virtual machine status, and to enable the server node to place a request for a license from one of the virtual machines in a license request queue in response to allocation of a corresponding software license being denied.

5. The apparatus of claim 4, wherein the virtual machine state change notifier module forms part of a hypervisor module to monitor operations of the virtual machines on the virtual machine host node.

6. The apparatus of claim 4, further comprising:
   a universally unique identifier (UUID) management module to create a new UUID for each one of the virtual machines when each one of the virtual machines is created, the UUID to be associated with license requests to the server node.

7. A method of managing a plurality of software licenses implemented in a computer-readable storage medium and adapted to be executed by a processor for performing the method, comprising:
   receiving reports at a server node, the reports indicating a change in virtual machine status for virtual machines hosted on a virtual machine host node, each of the virtual machines assigned to a universally unique identifier (UUID), the UUIDs for the virtual machines being different from one another; and
   allocating or deallocating one or more of the plurality of software licenses to the virtual machines based on the change in virtual machine status, the allocating or deallocating including placing a request for a license from one of the virtual machines in a license request queue in response to allocation of a corresponding software license being denied.

8. The method of claim 7, wherein the allocating comprises:
   calling a virtual machine preference module that refers to at least one policy to determine the allocating or the deallocating.

9. The method of claim 7, wherein the allocating comprises:
   restricting allocation based on life cycle events associated with the virtual machines.

10. The method of claim 9, wherein the life cycle events comprise at least one of creation, destruction, cloning, suspension, resumption, or pausing.

11. The method of claim 7, wherein the change in virtual machine status is determined directly from a single one of the reports.

12. The method of claim 7, wherein the change in virtual machine status is determined indirectly from multiple ones of the reports.

13. The method of claim 7, further comprising:
publishing content from the reports to a system administrator.

14. The method of claim 7, wherein the reports comprise:
at least an identity of at least one of the virtual machines, and a state of the at least one of the virtual machines.

15. The method of claim 14, wherein the identity comprises:
the universally unique identifier (UUID) assigned to the at least one of the virtual machines.

16. A method of managing a plurality of software licenses implemented in a computer-readable storage medium and adapted to be executed by a processor for performing the method, comprising:
detecting, at a virtual machine host node, a change in virtual machine status for virtual machines hosted on the host node, each of the virtual machines assigned to a universally unique identifier (UUID), the UUIDs for the virtual machines being different from one another; and
transmitting reports to a server node from the host node, the reports indicating the change in virtual machine status, to enable the server node to allocate or de-allocate the software licenses to the virtual machines based on the change in virtual machine status, and to enable the server node to place a request for a license from one of the virtual machines in a license request queue in response to allocation of a corresponding software license being denied.

17. The method of claim 16, further comprising:
sending a license deactivation request from the virtual machine host node to at least one of the virtual machines.

18. The method of claim 16, further comprising:
sending a license deactivation request to one of the virtual machines from the virtual machine host node upon determining that the one of the virtual machines has been destroyed or powered down for a selected length of time.

19. The method of claim 16, wherein the transmitting comprises:
transmitting the reports from a virtual machine state change notifier module residing on the host node to a virtual machine state change receiver module residing on the server node.

20. The method of claim 16, wherein the transmitting comprises:
transmitting the reports directly from a hypervisor operating on the host node.

21. The method of claim 16, further comprising:
generating a new universally unique identifier (UUID) to associate with one of the virtual machines when the change in virtual machine status indicates a new status of moved or cloned.

22. The method of claim 16, further comprising:
receiving notification of license expiration from one of the virtual machines; and
deactivating software associated with the license expiration until a new license is allocated by the server.

23. The method of claim 16, wherein the reports comprise:
at least one of a status or a change in status of at least one of the virtual machines, and the universally unique identifier (UUID) of the at least one of the virtual machines.

24. The apparatus of claim 1, wherein the server node is configured to generate a new universally unique identifier (UUID) for a virtual machine that is cloned from one of the virtual machines.

25. The apparatus of claim 1, wherein the server node is configured to allocate a new software license for a virtual machine that is cloned from one of the virtual machines.

26. The apparatus of claim 1, wherein the reports comprise the universally unique identifier (UUID) for at least one of the virtual machines.

* * * * *